(12) United States Patent
Glucksman et al.

(10) Patent No.: US 7,213,507 B2
(45) Date of Patent: May 8, 2007

(54) INFUSION BEVERAGE BREWING SYSTEM

(75) Inventors: Dov Z. Glucksman, Wenham, MA (US); Gary P. McGonagle, Lynn, MA (US); Laura J. Nickerson, Andover, MA (US)

(73) Assignee: Meyer Intellectual Properties Limited, Hong Kong (HK)

( * ) Notice: Subject to any disclaimer, the term of this patent is extended or adjusted under 35 U.S.C. 154(b) by 248 days.

(21) Appl. No.: 10/800,139

(22) Filed: Mar. 12, 2004

(65) Prior Publication Data

US 2005/0199129 A1    Sep. 15, 2005

(51) Int. Cl.
*A47J 31/18*    (2006.01)
(52) U.S. Cl. .......................................... 99/297; 99/287
(58) Field of Classification Search .................. 99/297, 99/287; 210/474, 479, 481
See application file for complete search history.

(56) References Cited

U.S. PATENT DOCUMENTS

| | | | |
|---|---|---|---|
| 3,324,787 A * | 6/1967 | McCleary | .................... 99/319 |
| 3,918,335 A | 11/1975 | Weber | |
| 4,650,583 A * | 3/1987 | Bondanini | ................... 210/474 |
| 4,896,022 A | 1/1990 | Schroeder et al. | |
| D343,759 S | 2/1994 | Jorgensen | |
| 5,453,189 A | 9/1995 | Joergensen | |
| 5,478,586 A | 12/1995 | Connor | |
| D372,627 S | 8/1996 | Ireland | |
| 5,544,566 A * | 8/1996 | Bersten | ....................... 99/287 |
| 5,632,194 A | 5/1997 | Lin | |
| 5,635,233 A | 6/1997 | Levinson | |
| 5,791,503 A * | 8/1998 | Lyons | ........................ 215/11.5 |
| 5,809,867 A | 9/1998 | Turner et al. | |
| 5,911,810 A | 6/1999 | Kawabata | |
| D415,648 S | 10/1999 | Joergensen | |
| 5,979,299 A | 11/1999 | Hornsby et al. | |
| 6,240,833 B1 | 6/2001 | Sham et al. | |
| 6,422,133 B1 | 7/2002 | Brady | |
| 6,797,160 B2 * | 9/2004 | Huang | ........................ 210/117 |
| 2003/0047081 A1 | 3/2003 | McGonagle | |
| 2003/0070979 A1 | 4/2003 | Huang | |

FOREIGN PATENT DOCUMENTS

| | | |
|---|---|---|
| CH | 108674 A | 2/1925 |
| DE | 20104815 U1 | 6/2001 |

\* cited by examiner

*Primary Examiner*—Reginald L. Alexander
(74) *Attorney, Agent, or Firm*—George A. Herbster

(57) ABSTRACT

An infusion beverage brewing system includes a container and an infuser. The infuser is positioned in a liquid, such as hot water, and has an infusing chamber for containing infusible materials, such as tea leaves. A plunger includes a piston with a peripheral seal and flap valves. After a brewing time has elapsed, an individual pushes on an operator to move the piston past a perforated wall portion of the infusing chamber. When the piston reaches a solid wall portion at the bottom of the infusing chamber, the flap valves open to allow liquid to escape. However, small apertures aligned with the flap valves prevent the passage of the infusible material. Consequently the infusible material is isolated from the liquid when the piston reaches a solid bottom wall portion of the infusing chamber.

37 Claims, 12 Drawing Sheets

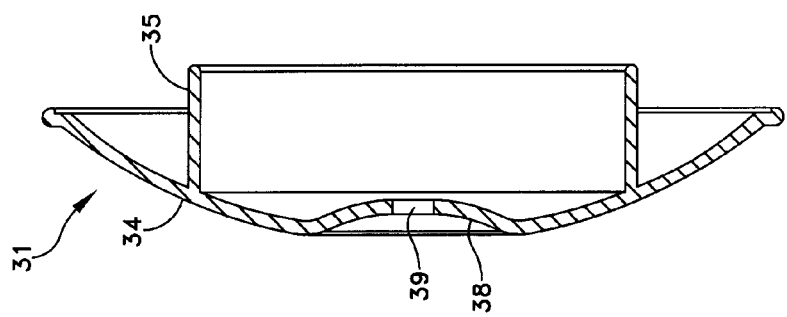
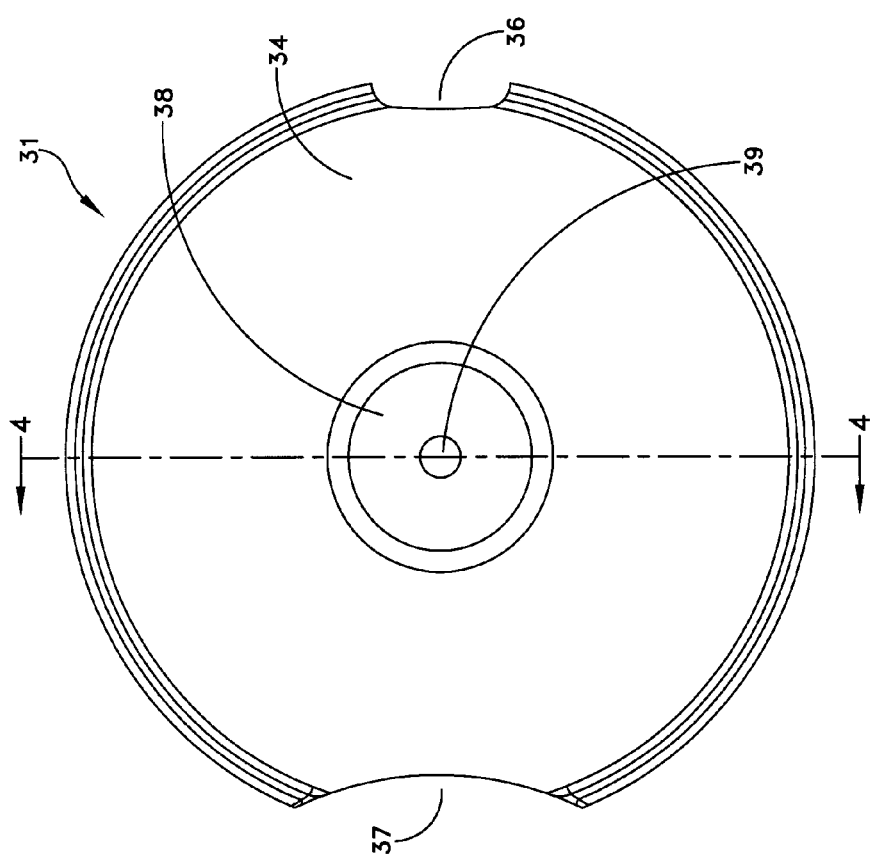

INFUSION BEVERAGE BREWING SYSTEM

BACKGROUND OF THE INVENTION

1. Field of the Invention

This invention generally relates to infusion beverage brewing systems and more specifically to coffee makers and tea makers.

2. Description of Related Art

A wide variety of products are available for making beverages such as coffee or tea. Basically, the brewing process involves bringing a liquid, such as hot water, into contact with an infusible material, such as ground coffee or tea leaves. This process infuses the water with the essence of the infusible material to produce a beverage.

In one category of such systems, particularly adapted for making coffee, an infusible material, such as ground coffee, is placed in an enclosed volume. Heated liquid is directed through the infusible material emerging as the beverage. A receiver, such as a coffee pot, accumulates the beverage. In another category, to which the application is applicable, the liquid and material to be infused are placed in a pot and allowed to steep for a brewing time. After that brewing time expires, the beverage is supposedly ready for consumption. If the beverage is allowed to continue to steep beyond the brewing time, the quality of the beverage can degrade. Typically the individuals characterize the beverages steeped for too long a period to be "too strong" or "bitter." This problem has resulted in an effort to control the brewing time with particular emphasis on different approaches to terminating any significant interaction between the infusible material and the beverage after the brewing time.

For example, U.S. Pat. No. 5,632,194 (1996) to Lin discloses an infusion beverage brewing system with a beaker and an inner cup for containing boiling water and tea leaves. During the brewing time a ball valve seals an aperture through the bottom of the inner cup. At the end of the brewing time, the inner cup is elevated from its normal position in the beaker. This releases and opens the ball valve so the beverage transfers into the beaker. In this particular approach, the displacement of the ball from its seat establishes a passage through which the beverage passes. If the passage is sufficiently large, the beverage can entrain tea leaves as it transfers into the beaker. Further, this approach requires an individual to hold the inner cup away from the beaker until such time all the beverage transfers into the beaker.

U.S. Pat. No. 5,635,233 (1997) to Levinson discloses a plunger-strainer or "french press" coffee maker. The infusible material and liquid are placed in a container. Then a plunger assembly with a lid is inserted into the beaker. After the brewing time, a plunger assembly is moved in an up and down motion but generally downward for sweeping the material into a volume below the plunger. The plunger includes a foam filter disk which is pushed through the infusible material and forms a closed volume at the bottom of the container for the infused material. However, this material is not impervious to liquid and acts as a filter. Thus, liquid can contact the infusible material and brewing can continue even after the infusible material is confined to the closed volume.

U.S. Pat. No. 5,979,299 to (1999) to Hornsby also discloses a plunger-filter infusion device with a container and a plunger with a resilient plunger head that slides within the container. A cup-like insert is placed in the base of the container with the infusible material. Heated water is poured into the container and after an appropriate brewing time the plunger is slid into the container until it engages the insert. As a result, the infusible material is confined by the plunger head in the insert. Both the plunger head and insert can be removed after the brewing time elapses. The plunger requires specific sealing structures (not shown) that accommodate the difference in diameters between the container and the insert in order to prevent the escape of the infusible material past the periphery of the plunger head.

U.S. Pat. No. 5,478,586 (1995) to Connor discloses a french press-type system characterized by an operation that differs from normal french press operations. In the Connor patent the plunger head is positioned at the bottom of a container during the brewing time. Then the plunger is lifted through the beverage to lift the infusible material to the top of the container. This system relies on peripheral sealing between the plunger and container to prevent the escape of infusible material back into the beverage as the plunger is withdrawn.

In U.S. Pat. No. 6,422,131 (2002) to Brady the plunger in a french press coffee maker includes a filter element that permits the flow of liquid through the plunger without allowing the passage of the infusible material therethrough. A buffer element is situated above the plunger. The buffer element is closely spaced to the plunger. When the plunger is fully depressed, the buffer element decouples the flavored beverage from the infusible material to minimize interaction between the beverage and the material below the plunger after the brewing time has elapsed.

A marketed Bodum Assam brewing apparatus includes a cylindrical insert that is located in a container and has a solid wall portion at the bottom and a perforated intermediate wall portion. As the plunger passes through the insert, it forces the infusible material toward the bottom and eventually captures it in a closed volume at the bottom of the insert. This approach, however, relies upon the effectiveness of a peripheral seal that contacts the interior portion of the cylindrical insert. When the insert passes the solid wall portion, a significant hydraulic pressure can be produced below the insert and force the seal to open. Opening the seal allows at least some of the infusible material, such as tea leaves, to escape back into the beverage.

As will now be apparent, each of the foregoing examples of infusion beverage brewing systems is subject to one or more disadvantages. Some, such as the systems disclosed in the Yin and Hornsby patents, are made with extra elements that complicate the use of the apparatus either by requiring extra parts or specific operations. Others such as the Bodum system and systems disclosed in the Connor and Brady patents provide an apparatus that still allows material to escape into the beverage thereby to continue to brew beyond the desired brewing time. What is needed is an infusion beverage brewing system in which the infusible material can be fully isolated from the beverage after the brewing time elapses thereby to avoid continued interaction between the beverage and the infusible material that could otherwise degrade the quality of the beverage.

SUMMARY

Therefore it is an object of this invention to provide an infusion beverage brewing system that accurately controls the brewing time.

Another object of this invention is to provide an infusion beverage brewing system that enables the infusible material to be fully isolated at the end of the brewing time so there is no additional interaction between the beverage and infusible material.

Still another object of this invention is to provide an infusion beverage brewing system that is easy to use and clean.

Yet another object of this invention is to provide an infusion beverage brewing system that is characterized by simplicity of construction and reduced manufacturing expense.

In accordance with this invention an infusion beverage brewing system includes a container and an infuser. The container has an open top for receiving a quantity of liquid. The infuser includes an open-top infusing chamber and a plunger assembly. The open-top infusing chamber has a solid bottom wall portion and an adjacent perforated intermediate wall portion for receiving an infusible material. The plunger assembly includes a piston spanning the infusing chamber in a sealed relationship. The piston has a one-way valve therethrough. After the brewing time, an operator moves the piston past the perforated wall portion to the solid wall portion. The piston and the solid wall define a closed volume that isolates the infusible material from the brewed beverage.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is a top view of a cover that is useful in accordance with this invention;

FIG. 4 is a cross section view taken along lines 4—4 in FIG. 3;

DESCRIPTION OF ILLUSTRATIVE EMBODIMENTS

Figure 1:
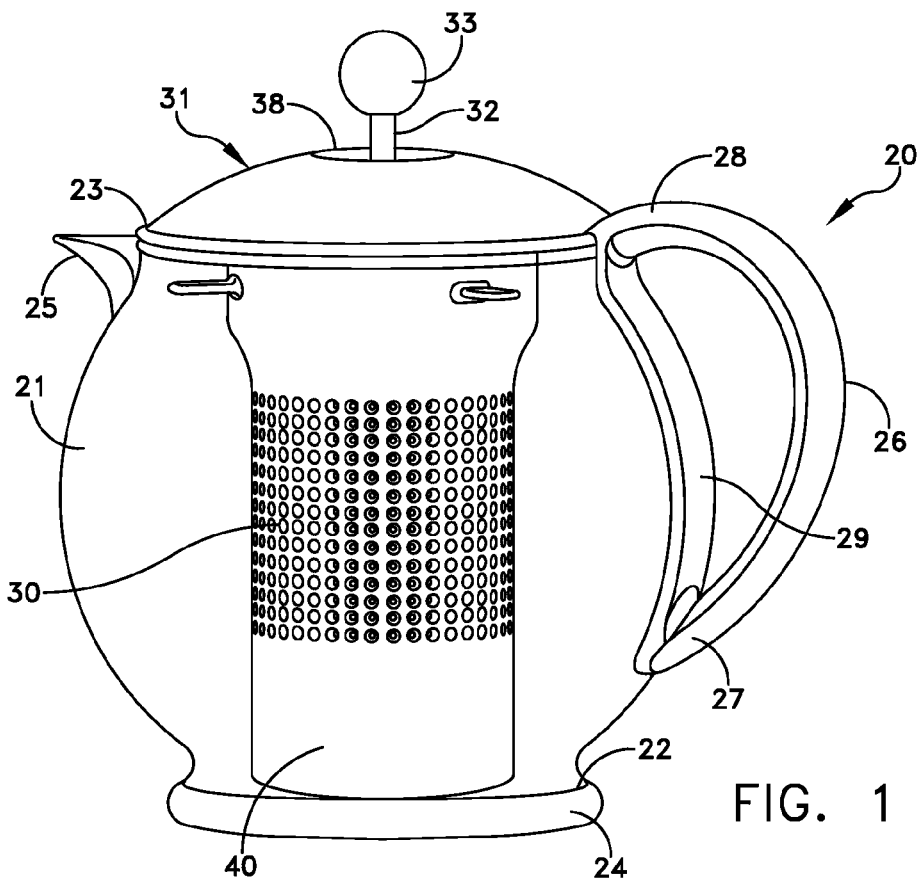
FIG. 1 is a perspective view of a teapot as one example of an infusion beverage brewing system constructed in accordance with this invention.
Figure 2:
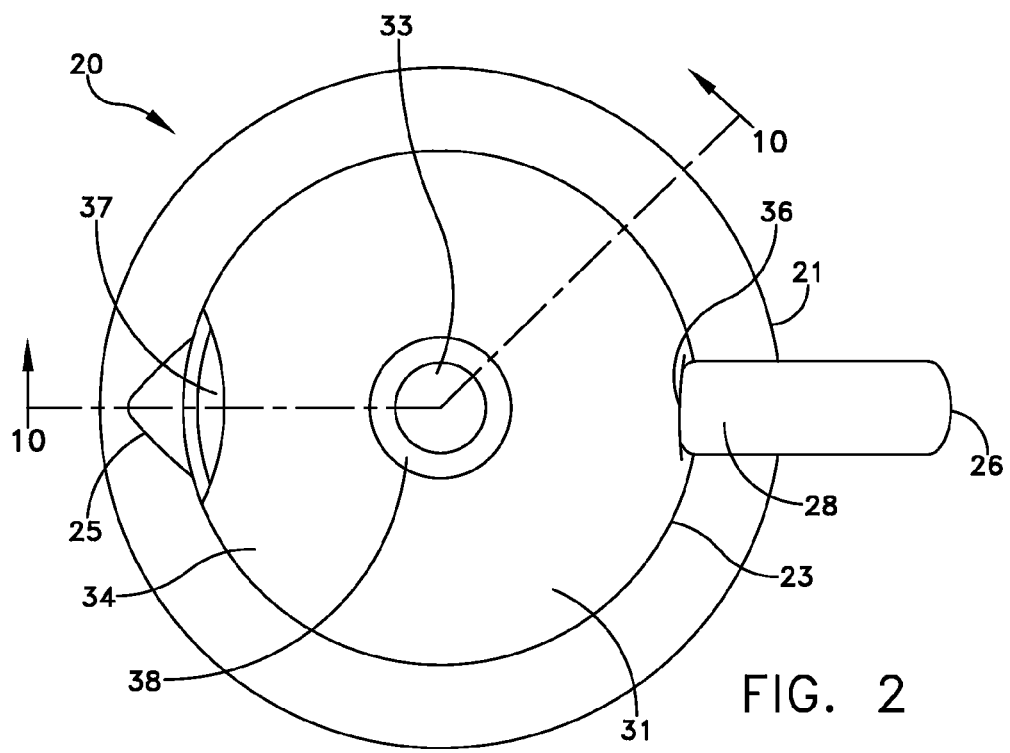
FIG. 2 is a top view of the teapot shown in FIG. 1.

FIGS. 1 and 2 depict a teapot 20 as an example of an infusion beverage brewing apparatus. The teapot 20 includes a quasi spherical, transparent container 21 with a flat bottom 22 and a top opening 23. This is an example of a container with an open top for receiving a quantity of hot liquid and for infusing that liquid to produce a beverage. In this particular embodiment a coaster 24 underneath the flat bottom 22 acts as an insulator to prevent damage to any supporting surface. The container 21 can be formed of glass or any other material that will withstand the liquid temperatures and be chemically inert and the container 21 can have a variety of shapes.

The container 21 has a pouring spout 25 formed at the top opening 23. At a diametrically opposed location, an integral handle 26 is attached to the spherical container 21. The handle 26 has a lower portion 27, an upper portion 28 and an intermediate portion 29, that attaches at the top opening 23. The intermediate portion 29 conforms to the shape of the container 21 and spans the handle portions 27 and 28. Gluing or other fastening techniques can be used to attach the handle 26 to the container 21. The handle 26 can also have any of a variety of shapes. The handle 26 typically will be formed of a material that can be attached to glass using adhesive and other known techniques.

FIGS. 1 and 2 also disclose an infuser 30 with a lid 31 that fits in the top opening 23 and a piston rod 32 capped with a knob 33 to facilitate operation. As particularly shown in the embodiment of FIGS. 2 through 4, the lid 31 includes a generally convex cover 34 and an integral annular extension or skirt 35. A handle alignment recess 36 engages the upper handle portion 28 that protrudes into the top opening 23 to align the lid 31 angularly on the container 21 so a second, or spout, recess 37, diametrically opposed from the handle alignment recess 36, aligns with the pouring spout 25. The cover 34 has a concave portion 38 with a central aperture 39. The concave portion 38 partially nests the knob 33 at its lower most position. The aperture 39 provides a passage for the piston rod 32.

Figure 5:
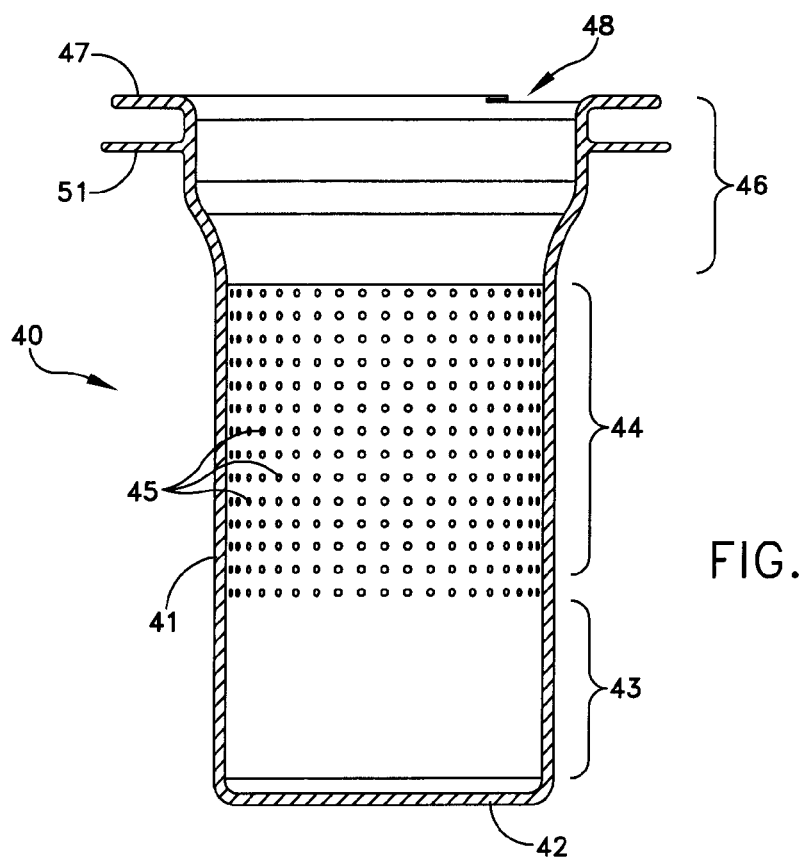
FIG. 5 is a cross-sectional view of an infusing chamber constructed in accordance with this invention.
Figure 6:
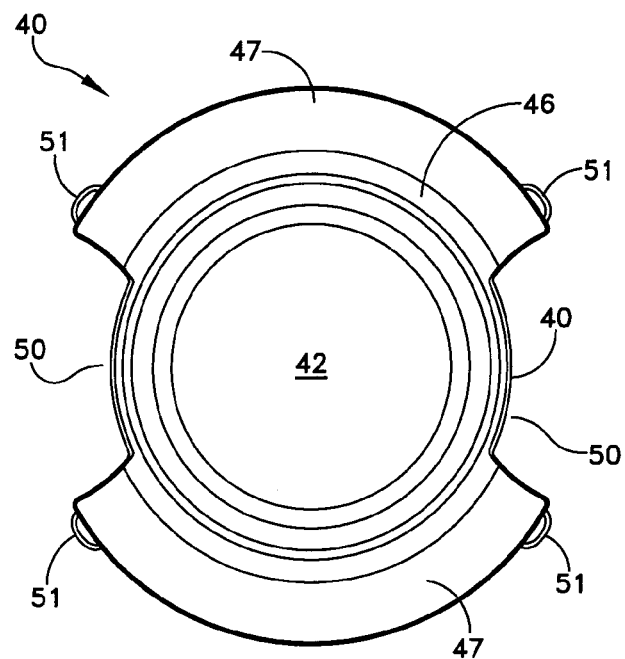
FIG. 6 is a top view of the infusing chamber shown in FIG. 5.

As shown in FIG. 1, the infuser 30 also includes an infusing chamber 40. Referring now to FIGS. 5 and 6, the infusing chamber 40 has a generally cylindrical body 41 that extends from a closed bottom 42 to an open top 48. The body 41 has a lower solid wall portion 43 and an intermediate perforated wall portion 44 comprising a plurality of perforations 45. Each of the perforations 45 has an opening sized to allow the liquid to pass and to block any particles of an infusible material, such as loose tea leaves.

An upper flared portion 46 extends above the intermediate portion 44. The flared portion 46 terminates in a flange 47. As shown particularly in FIG. 6, the flange 47 has oppositely disposed recesses 50 that provide finger holes for facilitating the insertion and removal of the infusing chamber 40 into and from the container 21. The flange 47 also circumscribes an opening 48 at the top of the cylindrical body 41.

In this particular embodiment four radial arms 51 extend from the side walls of the upper flared portion 46 and have a length which is slightly larger than the diameter of the top opening 23. However, the arms are flexible in a vertical direction. Thus as the infusing chamber 40 is inserted into the container 21 of FIG. 1, the radial arms 51 flex as they pass through the throat portion of the top opening 23 and then return to their normal position. The flange recesses 50 allow an individual to grasp the flange 47 in order to withdraw the infusing chamber 40 from the container 21. As the infusing chamber 40 is withdrawn, the radial arms 51 to flex downwardly to pass through the top opening 23 of FIG. 1.

Figure 7:
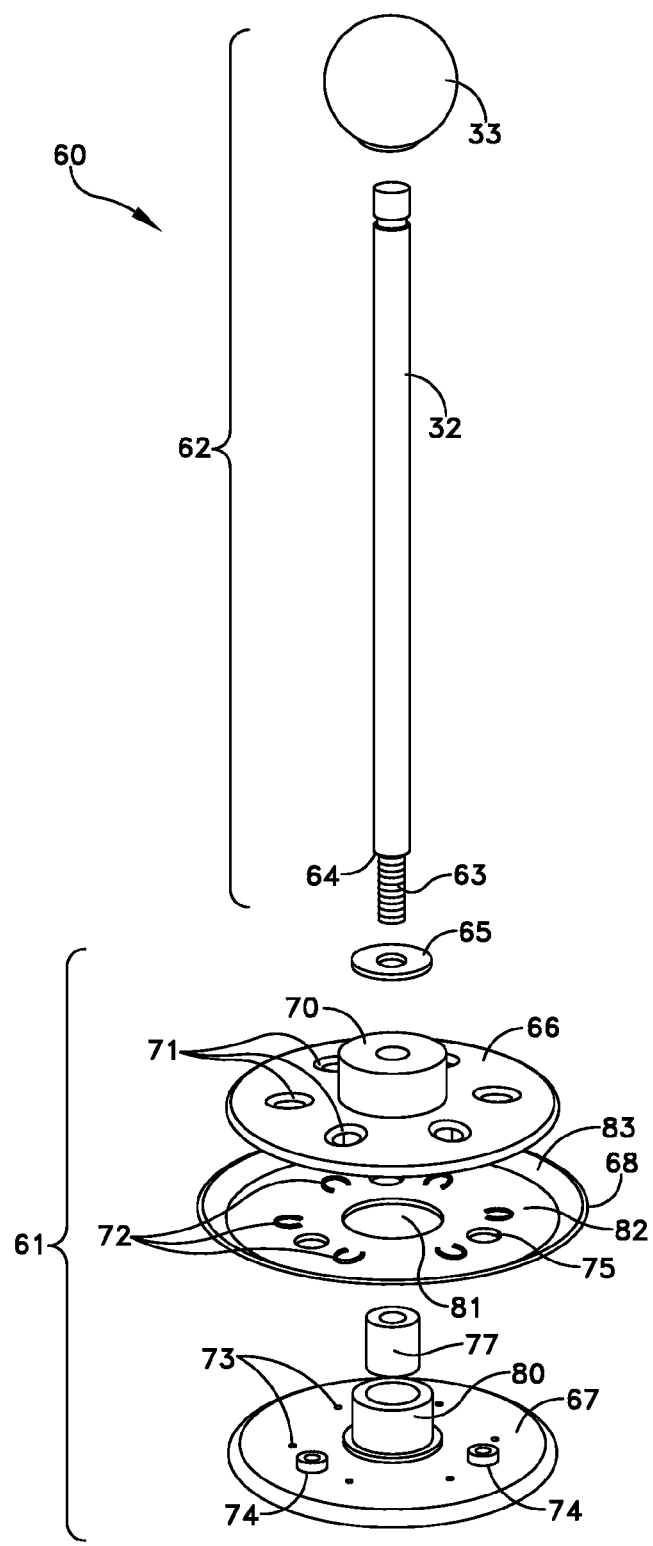
FIG. 7 is an exploded perspective view of a plunger constructed in accordance with this invention.
Figure 8:
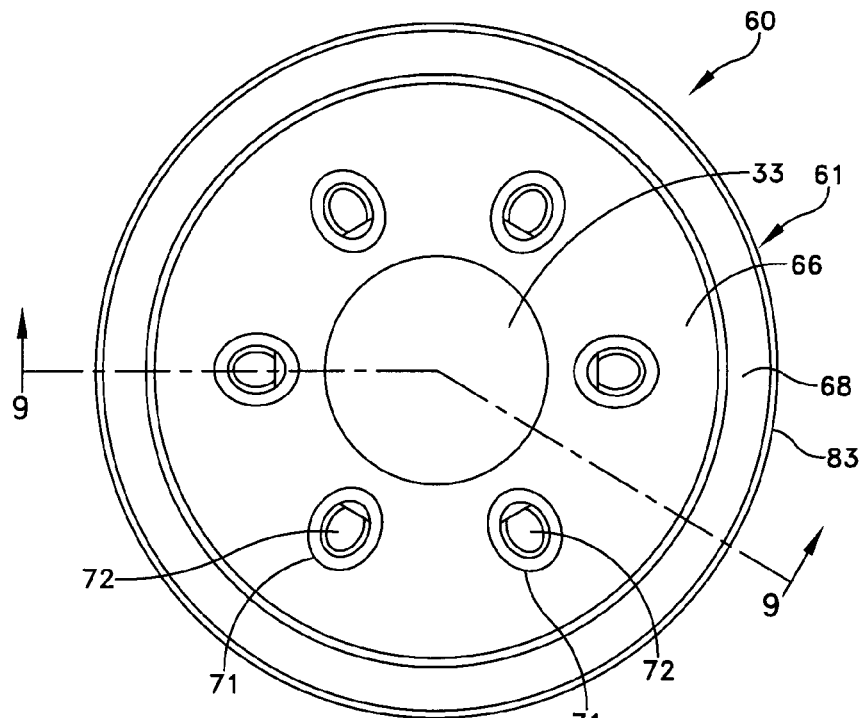
FIG. 8 is a top view of the plunger of FIG. 7.
Figure 9:
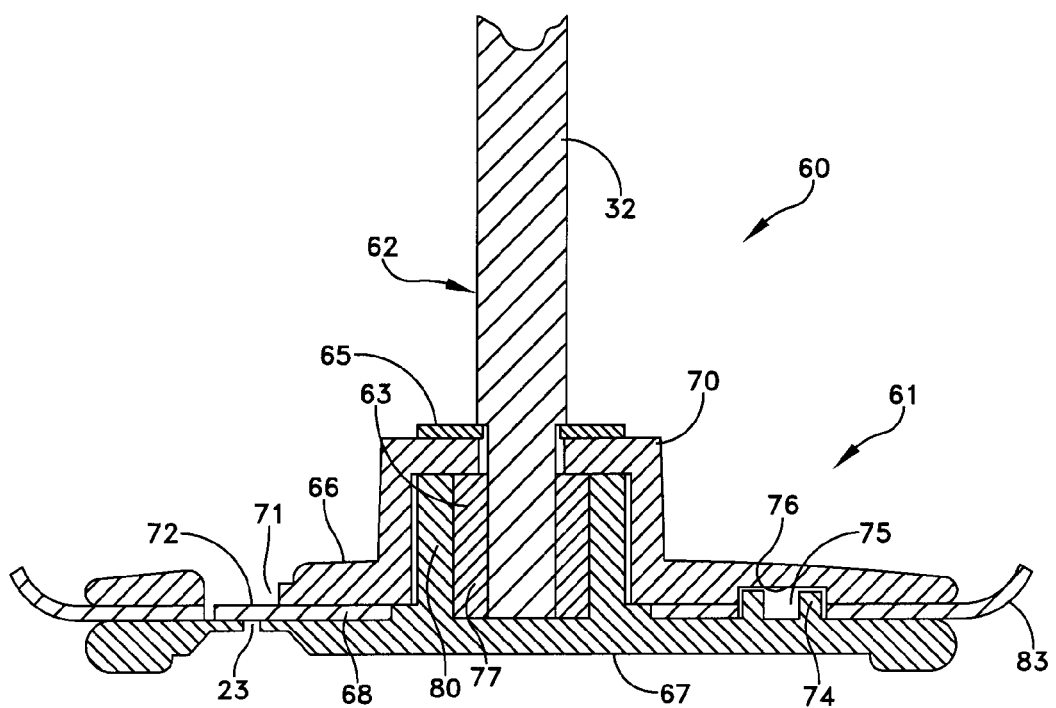
FIG. 9 is an enlarged cross-section view of a portion of the plunger assembly taken along lines 9—9 in FIG. 8.

FIGS. 7 through 9 depict one embodiment of a plunger assembly 60 for being displaced within the infusing chamber 40. This specific plunger assembly 60 includes a piston 61 and an operator 62. As will be described in greater detail, the piston 61 spans the infusing chamber 40 and forms a sliding seal with the interior of the infusing chamber 40. The piston 61 incorporates at least one, and preferably a plurality of, one-way valves that allow liquid to pass through the piston 61 while blocking the passage of any infusible material. The operator 62 provides a means for advancing the piston 61 past the intermediate perforated wall portion 44 to the solid lower wall portion 43 as shown in FIG. 5.

Still referring to FIGS. 7 through 9, the piston 61 attaches to a threaded end shank 63 at the end of the piston rod 32 opposite the knob 33. A shoulder 64 and thrust washer 65 establish the position of the piston 61 along the piston rod 32.

The piston 61 includes an upper rigid disk 66, a lower rigid disk 67 and an intermediate flexible disk 68. When assembled as shown in FIG. 9, the piston 61 attaches to the piston rod 32 and the thrust washer 65 bears against the shoulder 64. A post 70 is formed integrally with the upper rigid disk 66 and abuts the thrust washer 65.

The upper disk 65 also includes a plurality of angularly spaced apertures 71. The flexible disk 68 includes a plurality of flap valves 72 formed as tongues that are in angular alignment with the apertures 71. The lower rigid disk 67 includes apertures 73 that are angularly aligned with the flap valves 72 and the apertures 71. Each aperture 73 has a diametric that is less that the dimension of the smallest tea leave, but that is sufficient to allow the passage of water. In one embodiment for brewing tea, the apertures have a diametric of about 1 mm. As a result, the apertures 73 provide a filtering or straining function to prevent the passage of tea leaves. Angularly spaced posts or bosses 74 on the lower rigid disk 67 extend through registration apertures 75 in the flexible disk 68 and engage registered recesses 76 on the underside of upper rigid disk 66 to maintain angular alignment.

An internally threaded ferrule 77 permanently attaches to a post 80 on the lower rigid disk 67. The post 80 extends through a central aperture 81 in the flexible disk 68 and into the post 70 on the upper rigid disk 66. The end shank 63 threads into the ferrule 77. Thus when the piston 61 is properly assembled, the rigid disks 66 and 67 clamp a central portion 82 of the intermediate disk 68. However, a peripheral sealing portion or seal 83 extends beyond the peripheries of the rigid disks 66 and 67 to form a sliding seal with the infusing chamber 40 of FIGS. 5 and 6.

Figure 10:
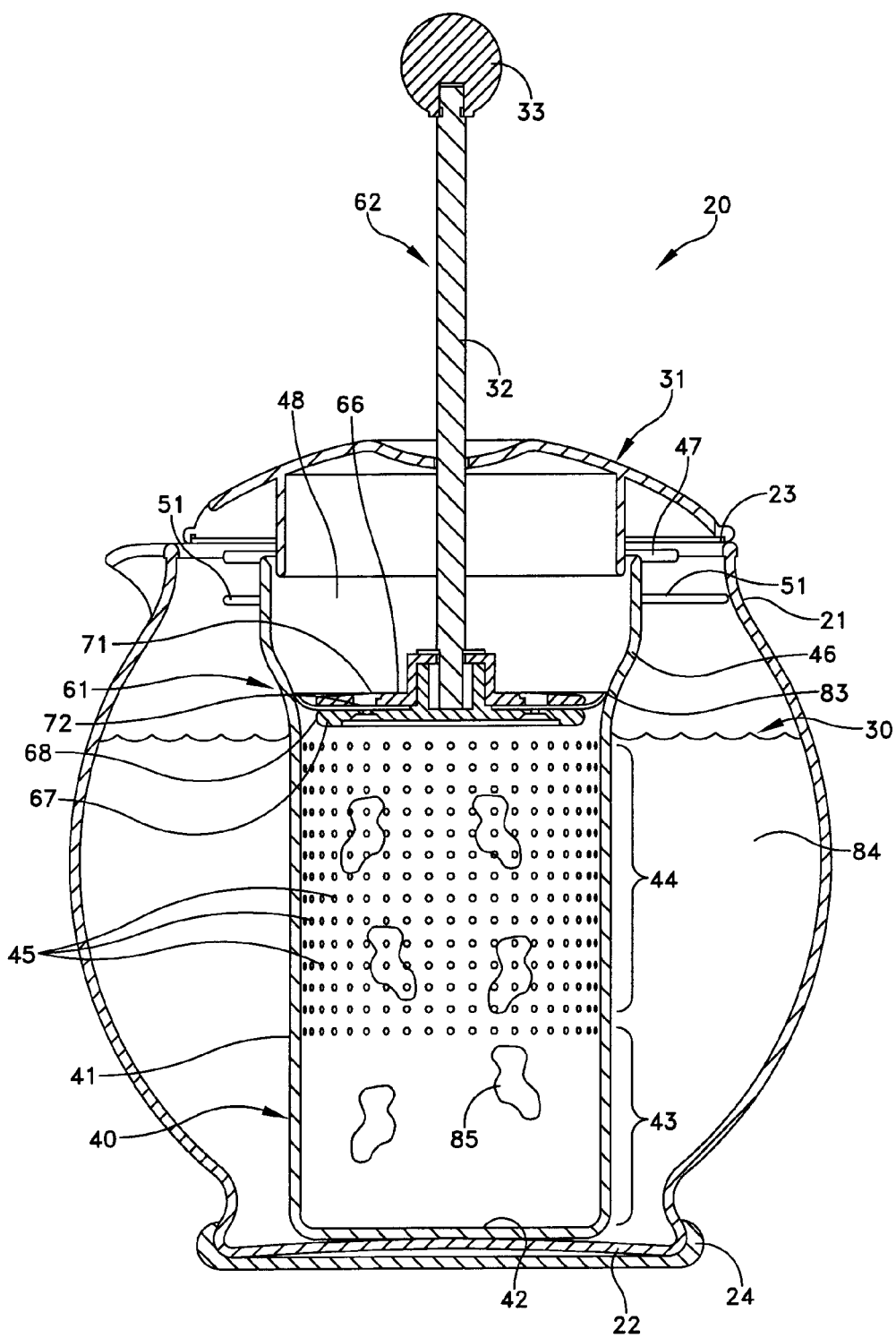
FIG. 10 is a cross-section view taken along lines 10—10 in FIG. 2 with the plunger of FIGS. 7 through 9 retracted.

In use, the cover 31 and plunger assembly 60 of the teapot 20 are assembled as shown in FIG. 10. The container 21 is filled with liquid 84 to a predetermined level, generally to some level that is within the confines of the intermediate perforated portion 44. An infusible material, such as tea leaves 85, is placed in the infusing chamber 40 either before or after the infusing chamber 40 is inserted into the container 21 with or without liquid 84.

FIG. 10 represents one orientation of the plunger assembly 60 during the brewing process. In this orientation, the piston 61 is elevated to a first position where the peripheral seal 83 just engages the narrowed portion of the upper flared portion 46. During this time the tea leaves 85 infuse the liquid 84 within the confines of the infusing chamber 40. As known, some of the infused liquid 84 will migrate outside the infusing chamber 40 through the perforations 45 as a result of liquid movement by convection and by other forces, such as osmotic pressure differences caused by the differences in the amount of soluble material.

Figure 11:
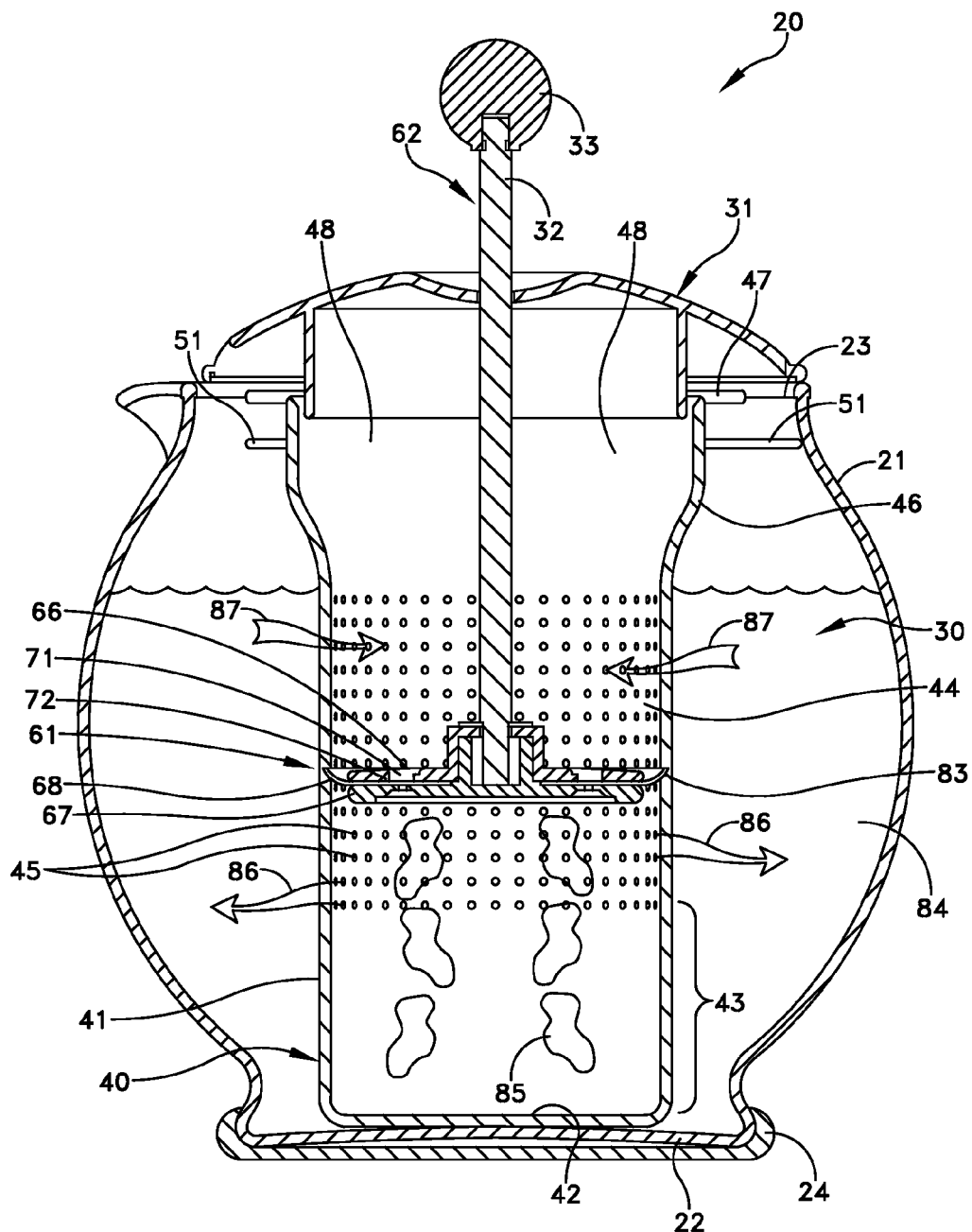
FIG. 11 shows the teapot as shown in FIG. 10 with the plunger of FIGS. 7 through 9 at an intermediate position.
Figure 12:
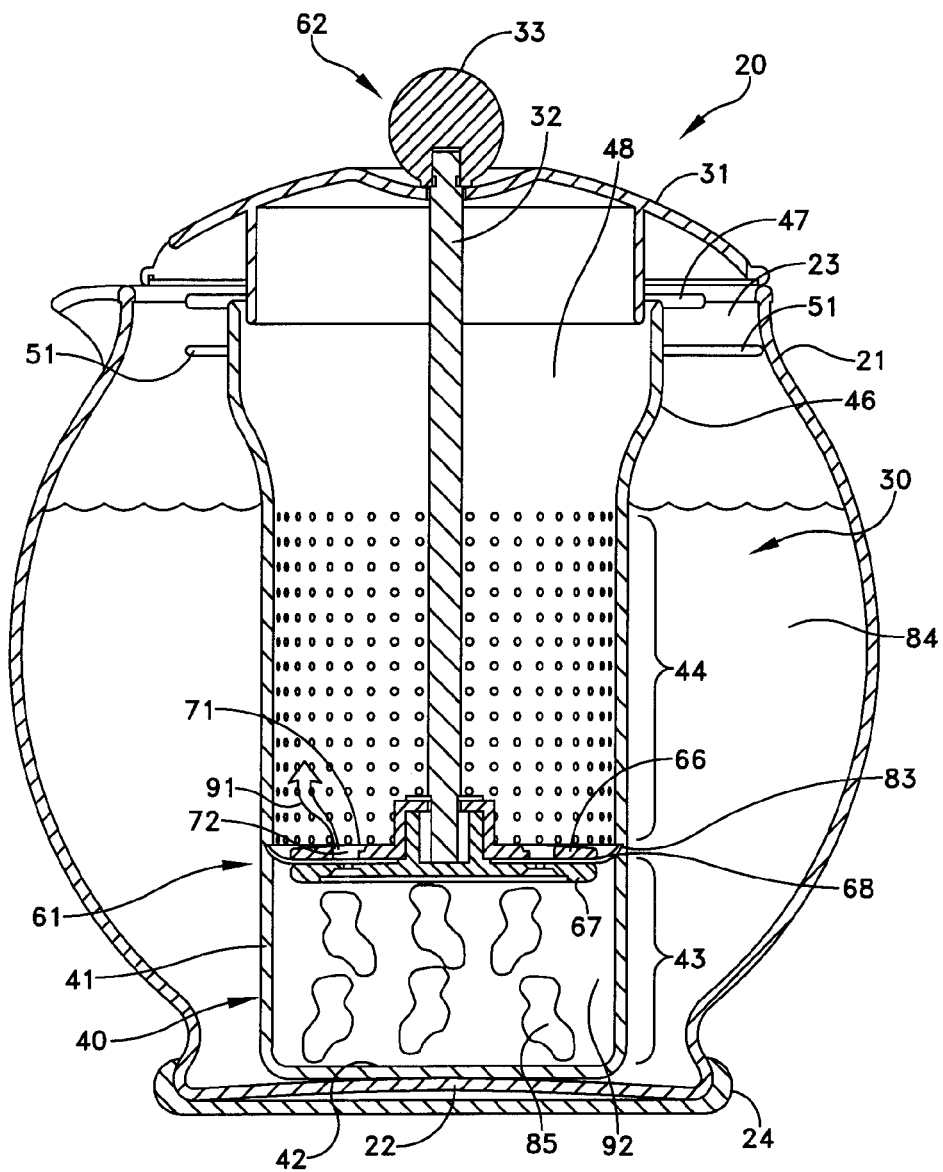
FIG. 12 shows the teapot as shown in FIG. 10 with the plunger of FIGS. 7 through 9 depressed.

When the brewing interval expires, the plunger assembly 60 is pushed downwardly through a range of intermediate or second position, one such position being shown in FIG. 11 to a final or third position shown in FIG. 12. Referring to FIG. 11, as the plunger assembly 60 moves down, the peripheral seal 83 slides along the interior surface of the intermediate perforated wall portion 44. During this downward motion, the piston 61 expels liquid below the piston 61 through the perforations 45 as represented by arrows 86. To maintain equilibrium liquid reenters the infusing chamber 40 through perforations 45 above the piston 61 as represented by arrows 87.

The resistance to this liquid transfer as the piston 61 moves past the perforated portion 44 is minimal due to the large effective area of all the perforations 45 below the piston 61. Consequently there is only a minimum force acting on the peripheral seal 83 and the flap valves 72. More specifically, the upward force applied to the peripheral seal is well below the threshold pressure that would break the seal with the body 41. As the piston 61 approaches the bottom solid wall 43, the upward force may tend to open the flap valves 72, but the apertures 73 block any of the tea leaves 85 from passing through the piston 61.

When the piston 61 reaches the solid wall portion 42 as shown in FIG. 12, further motion within the confines of the infusing chamber 40 increases the pressure on the peripheral seal 83. However, the pressure exerted by the liquid below the piston 61 will be greater than the pressure exerted by the liquid above the piston 61. Specifically, the mechanical force exerted by the piston 61 as it moves into the portion of the body 41 defined by the solid lower wall portion 42 increases the pressure of the liquid below the piston 61. With a continued downward force applied to the operator 62, the flap valves 72 will displace upward into the larger apertures 71 and open the passages through the apertures 73.

Figure 13:
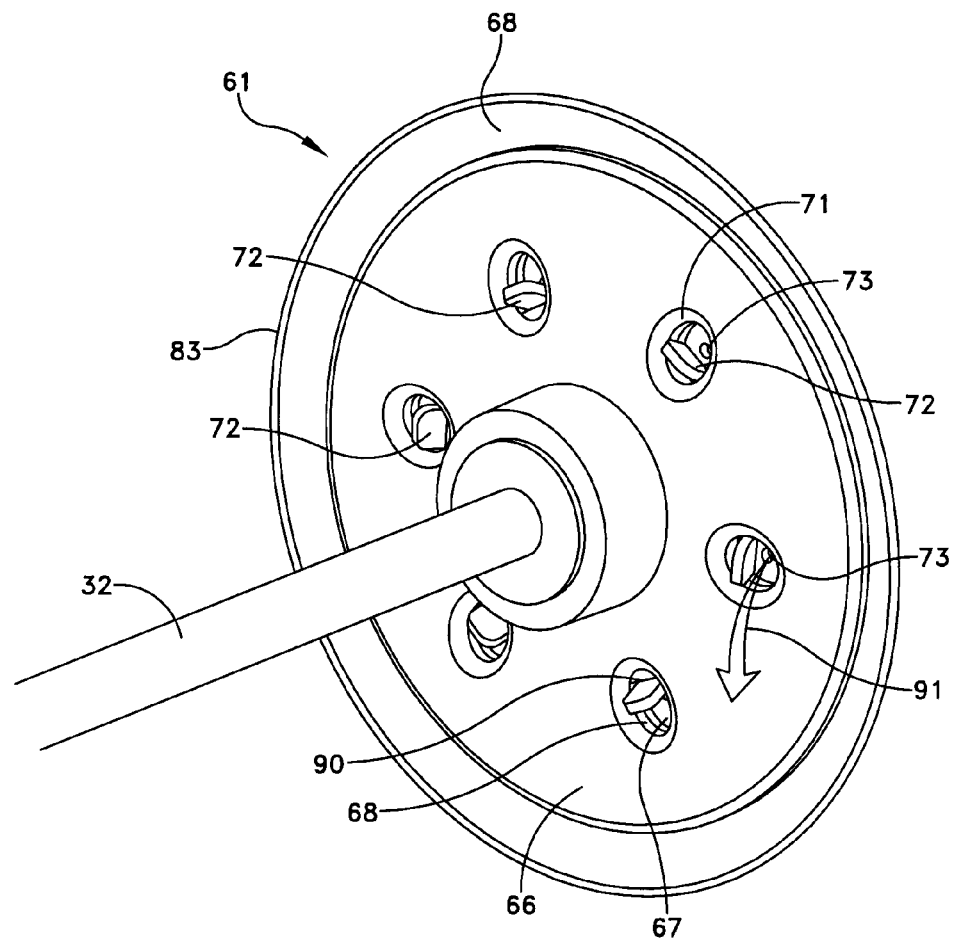
FIG. 13 is a perspective view of a portion of the plunger assembly shown in FIG. 12.

More specifically and referring to FIGS. 12 and 13, each flap valve 72 shown in the figures is formed by stamping or otherwise forming a horse shoe shaped slit through the intermediate flexible disk 82 forming a hinge portion 90. As the pressure increases, the force from the liquid below the apertures 73 lifts the flap valves 72 about their respective hinge portions 90. Liquid then passes through the apertures 73 in the lower rigid disk 67, the flap valves 72 and the apertures 71 as represented by arrow 91. The bottom disk 67 blocks any tea leaves 85 from passing through piston 61 and escaping into the beverage due to the small size of the apertures 73. The open flap valves 72 minimize the pressure differential across the piston 61 to a value that is well below the threshold at which the peripheral seal 83 might leak preventing any tea leaves from escaping back into the beverage past the peripheral seal 83.

When the piston 61 stops at a position corresponding to the position shown in FIG. 12, the pressures above and below the piston 61 equalize. The flap valves 72 close due to their tendency to return to their relaxed positions forming a seal across each aperture. This completely isolates a closed volume 92 defined by the infusing chamber bottom 42, the lower solid wall portion 43 and the piston 61. As the tea leaves 85 can no longer interact with the liquid in the container 21, brewing stops. The isolation continues even as the beverage is poured.

The radial arms 51 define an outer circumference that is greater than the top opening 23 so that the infuser 30 can not be displaced from the container 21 accidentally. The friction exerted by the periphery seal 83 on the solid wall portion 43 prevents the piston 61 from displacing toward the top opening 23 to release the captured infusible material in the closed volume 87.

As will now be apparent, the specifically disclosed teapot 20 in FIGS. 1 and 10 through 12 and other equivalent infusion beverage brewing systems will meet all the objectives of this invention. By forming the closed volume 92 in FIG. 12, all interaction between the infusible material, such as the tea leaves 85, and the infused liquid 84 above the piston 61 terminates. Thus, the brewing time is accurately controlled by depressing the plunger assembly 60 at the end of the brewing time because there is no additional interaction between the beverage and the infusible material.

The teapot 20 is easy to use. To brew a beverage, an individual could grasp the infusing chamber 40 and install it in the container 21. Then the individual could add an appropriate quantity of tea leaves 85 into the infusing chamber 40 and pour hot liquid into the infusing chamber 40.

Figure 14:
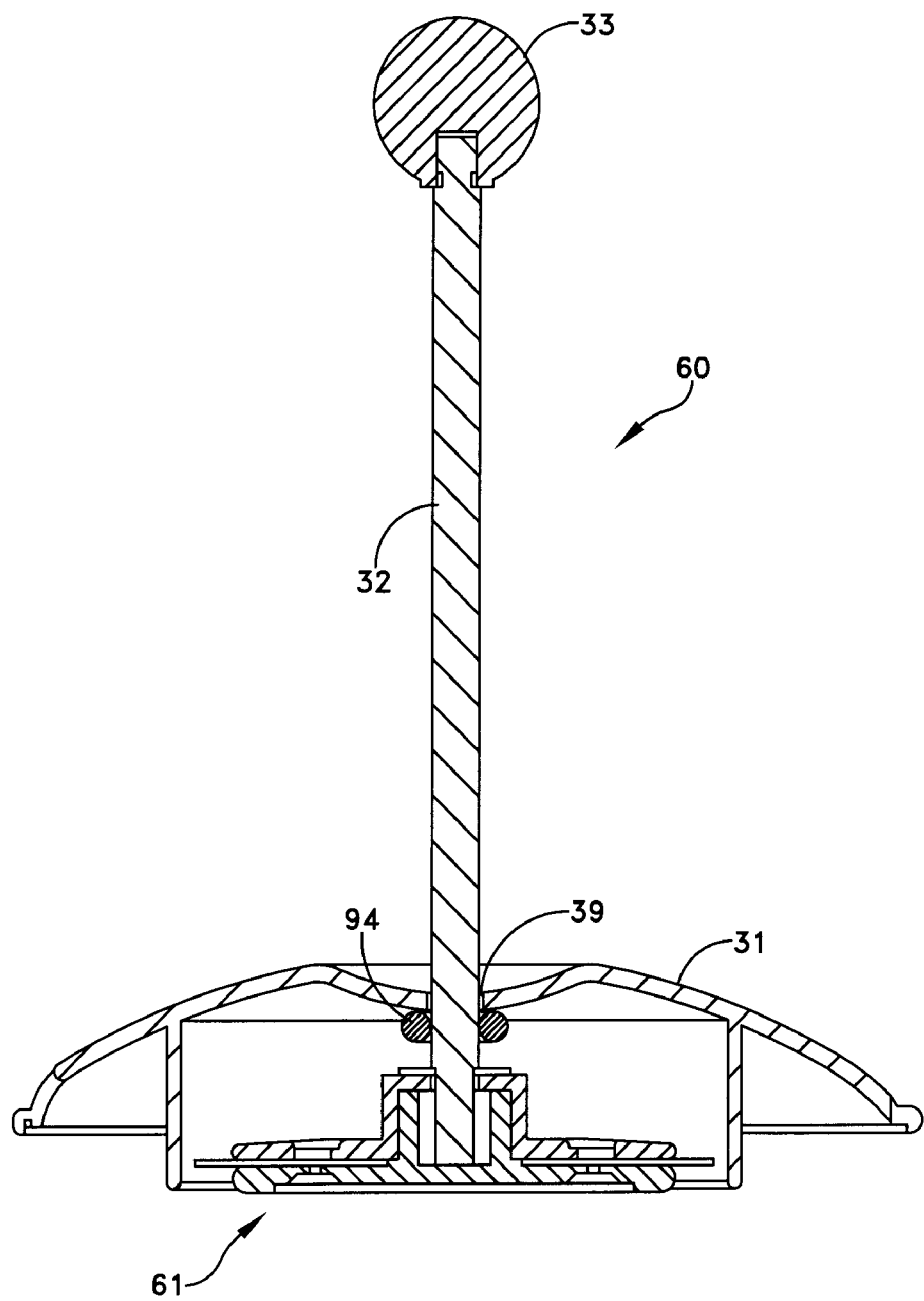
FIGS. 14 and 15 depict alternative embodiments of a plunger shown in FIGS. 7 through 9.
Figure 15:
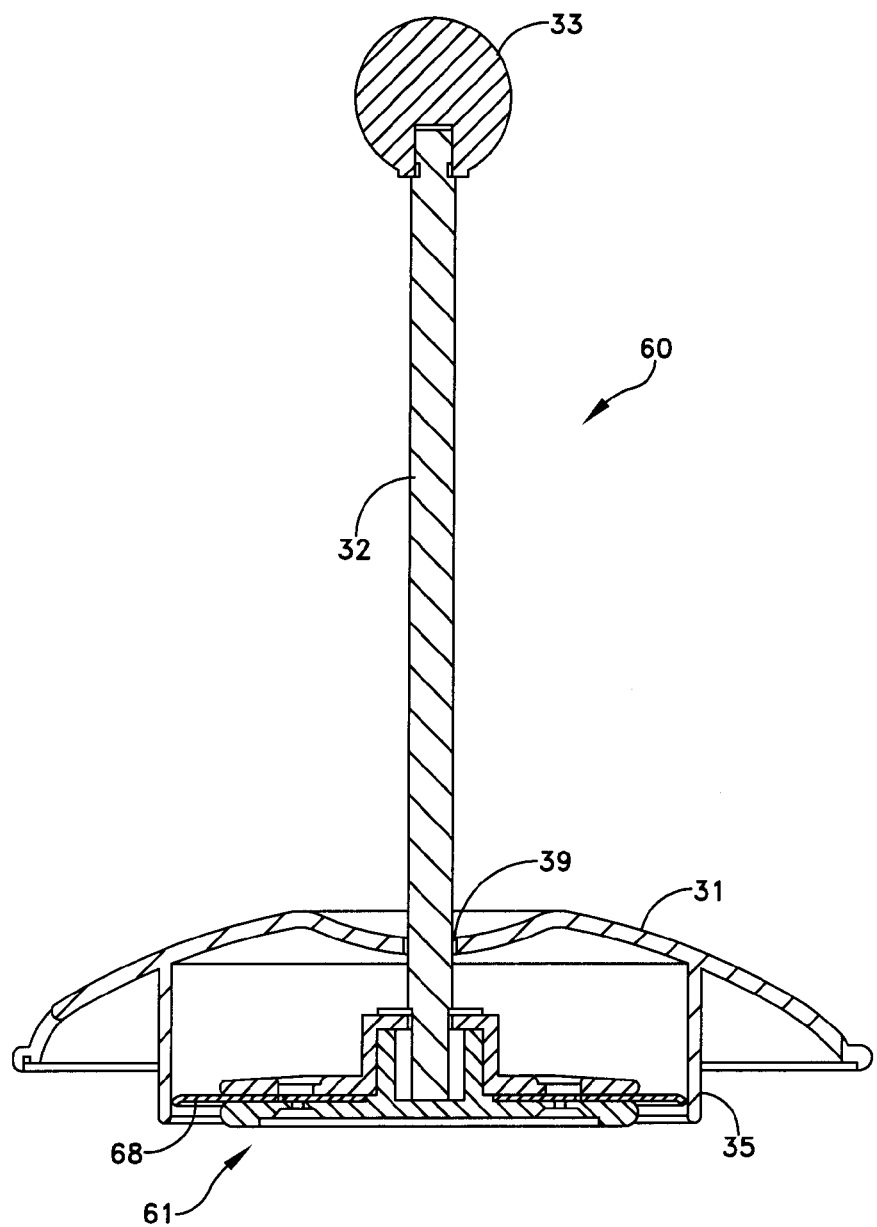

Next the individual can pick up the plunger assembly 60 and preferably move the lid 31 to be proximate the piston 61 or even positioned to nest the piston 61 within the skirt 35. In an alterative embodiment shown in FIG. 14 the lid 31 may carry an O-ring 94 at the aperture 39 to provide friction to keep the lid 31 proximate the piston 61. In another embodiment shown in FIG. 15 the skirt 35 can be sized to engage the perimeter of the flexible disk 68 to maintain that position.

With any of these or other plunger assembly embodiments, the next step is to install the plunger assembly 60 into container 21. During this procedure, the radial arms 51 stabilize the position of the infusing chamber 40 so it remains aligned with the opening 23 to receive the plunger assembly 60. The upper flared portion 46 assists in guiding the exposed piston 61 or the skirt 35, whichever makes first contact, into the infusing chamber 40.

After the brewing time is elapsed, the individual pushes the knob 33 to move the piston 61 from its first position, as shown in FIG. 10, to the final or third position of FIG. 12 thereby to complete the brewing process.

The teapot 20 is also easy to clean. After use, the individual merely raises the knob 33 to disengage the piston 61 from the infusing chamber 40 and removes the lid 31 along with the plunger assembly 60. Then the individual grasps the infusing chamber 40 at the flange recesses 50 to remove the infusing chamber 40. Tea leaves are then easily removed from the infusing chamber 40. The piston 61, operator 62 and lid 31 can be cleaned as a unit. For a more thorough cleaning it is merely necessary to unscrew the piston rod 32 from the ferrule 77 to separate all the components. After cleaning, the components are easily reassembled for subsequent use.

As will also be apparent, the infusing chamber 40 and each component of the plunger assembly 60 are readily manufactured from a wide range of materials that are readily stamped, drawn or molded to produce a finished component. As described with respect to the ease of cleaning, such components are easily assembled. Consequently an infusion beverage brewing system according to this invention is simple to construct at a minimal manufacturing expense.

A wide variety of modifications can be applied to the specifically disclosed teapot in FIGS. 1 through 15. For example, the specifically disclosed piston 61 has a first rigid disk above the flexible disk 68 and lower rigid disk 67. This configuration is adapted for operation where the piston is moved downward as shown in FIGS. 10 through 12. This invention could be adapted to a system in which the piston 61 is raised at the end of the brewing time merely by inverting the functions of the disks 66 through 68. That is, the large apertures could be formed in the lower disk, the small apertures could be formed in the upper disk, and the flexible disk 68 could be inserted.

Figure 16:
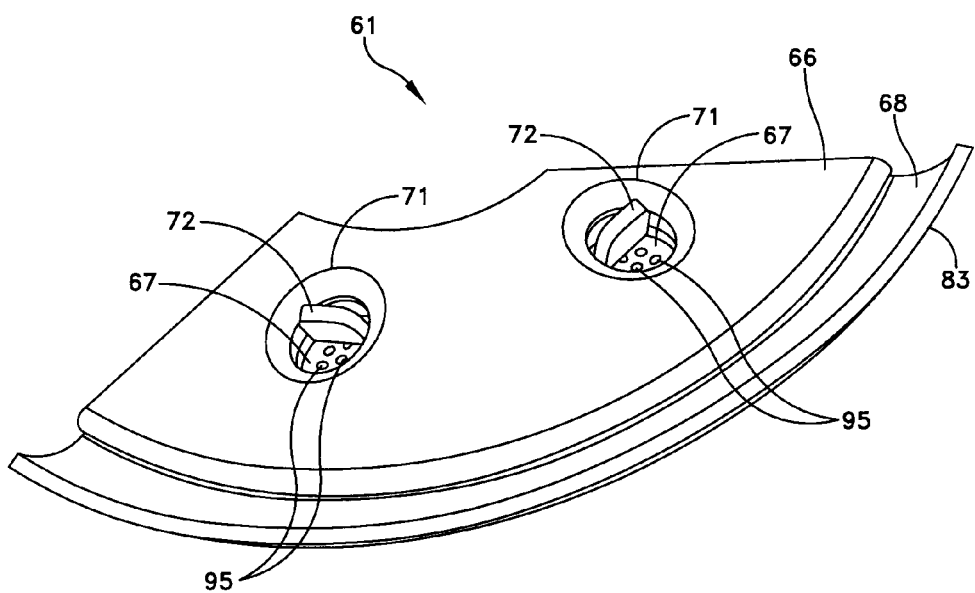
FIG. 16 depicts an alternate embodiment of a one-way valve used in the plunger assembly of FIGS. 7 through 9.

As other modifications, the piston 61 and operator 62 each can have a variety of shapes. The number of apertures and flap valves 72 and other aspects of their implementations can vary for other applications. For example, the plunger assembly 60 with its one-way valves may be adapted for use in other infusion beverage brewing systems such as french press coffee and tea makers that have a single cylindrical solid container. In systems for brewing coffee, the coffee grounds are small, so the filtering or straining apertures, like the apertures 73 in FIG. 13, may be ineffective. If the aperture size is reduced, however, a single aperture may restrict the flow and subject the peripheral seal 83 to failure. FIG. 16 depicts an alternative wherein the aperture 71 in the upper plate 67 and flap valve 72 remain in the same shape. However, the flap valve 72 overlies a plurality of apertures 95. Each aperture 95 has a smaller diameter to filter or strain the coffee grounds. However, the number of apertures under a flap valve 72 can be selected to provide a total cross sectional area that is equivalent to the area of the single aperture 73. In this way, the pressure required to move the piston 61 through the liquid will be limited so that the pressure should not rise to a level that would break the peripheral seal.

Therefore, it is the intent of the appended claims to cover all such variations and modifications as come within the true spirit and scope of this invention.

What is claimed is:

1. An infusion beverage brewing system comprising
   A) a container with an open top for receiving a quantity of hot liquid,
   B) an infuser including:
      i) an infusing chamber with open and closed ends having a solid wall portion extending from said closed end and a perforated wall portion intermediate said solid wall portion and said open end, said infusing chamber receiving a material to be infused, and
      ii) a plunger assembly for being displaced within said infusing chamber after the infusion, said plunger having
         a) a piston spanning said infusing chamber in a sealed relationship therewith, said piston comprising first and second rigid disks and an intermediate flexible disk having a one-way valve therethrough and
         b) an operator for moving said piston past said perforated wall portion to said solid wall portion wherein said valve opens to allow infused liquid to pass through said piston while blocking the passage of infusible material and closes when the motion of the operator terminates whereby said piston and said solid wall portion and said closed end form a repository for the material that is isolated from the liquid.

2. A beverage brewing system as recited in claim 1 wherein said piston includes a plurality of one-way valves therethrough.

3. A beverage brewing system as recited in claim 1 wherein the periphery of said intermediate flexible disk establishes a sliding seal relationship between said piston and the walls of said infusing chamber.

4. A beverage brewing system as recited in claim 3 wherein said flexible disk includes a plurality of angularly spaced one-way valves and wherein each of said rigid disks includes angularly spaced apertures aligned with said one-way valves.

5. A beverage brewing system as recited in claim 4 wherein each aperture in said first rigid disk has an opening that permits displacement of a corresponding flap valve.

6. A beverage brewing system as recited in claim 5 wherein each aperture in said second rigid disk has an opening that is smaller than the corresponding opening in said first rigid disk and that acts as a strainer to prevent the passage of the infused material therethrough.

7. A beverage brewing system as recited in claim 4 wherein said operator includes a rod having one end attached to said piston.

8. A beverage brewing system as recited in claim 4 wherein said operator includes a rod having one end detachably attached to said piston.

9. A beverage brewing system as recited in claim 8 wherein said rod has a shank and shoulder at said one end and includes a thrust washer intermediate said shoulder and said piston.

10. A beverage brewing system as recited in claim 4 wherein said piston includes structures for maintaining the angular alignment of said first and second rigid disks and said intermediate flexible disk.

11. A beverage brewing system as recited in claim 4 wherein said infusing chamber has a flared top opening to facilitate the insertion of said plunger into said infusing chamber.

12. A beverage brewing system as recited in claim 11 wherein said infusing chamber includes a flange with radial recesses for facilitating the removal of said infusing chamber from said container and a retainer for preventing the inadvertent displacement of said infusing chamber from said container during use.

13. A beverage brewing system as recited in claim 4 additionally including a cover, said container including a handle attached to said container adjacent said open top and said cover engages said handle for aligning said cover with respect to said container.

14. A beverage brewing system as recited in claim 13 wherein said container has a pouring spout and said cover has a pouring portion that aligns with said pouring spout.

15. A beverage brewing system comprising
A) open-top container means for receiving a quantity of hot liquid,
B) means for enabling a material to be infused including:
  i) infusing chamber means for receiving a material to be infused, said infusing chamber means including means for forming a closed end, a solid bottom wall adjacent said closed end and an adjacent perforated wall means, and
  ii) plunger means for being displaced within said infusing chamber means, said plunger means including:
    a) piston means spanning said infusing chamber means in a sealed relationship therewith, said piston means having flexible disk means for forming said one-way valve means and first and second rigid disk means for clamping said flexible disk means therebetween, said one-way valve means, in an open configuration, allowing liquid to pass through said piston means while blocking the passage of material when said piston means advances toward said solid bottom wall means, and
    b) operator means for advancing said piston means past said perforated wall means to said solid wall means whereby when said piston means is coextensive with said solid bottom wall means said valve means closes and said piston means and said infusing chamber means form a repository for the infused material that is isolated from the liquid.

16. A beverage brewing system as recited in claim 15 wherein said piston means includes a plurality of one-way valve means.

17. A beverage brewing system as recited in claim 15 wherein said flexible disk means forms a sliding seal with said solid wall means.

18. A beverage brewing system as recited in claim 17 wherein said flexible disk means forms a plurality flap means for defining a plurality of said one-way valve means angularly displaced and each of said rigid disk means includes angularly spaced apertures means for forming passages aligned with each of said flap means.

19. A beverage brewing system as recited in claim 18 wherein each aperture means in said first rigid disk means permits the displacement of a corresponding flap means.

20. A beverage brewing system as recited in claim 19 wherein said second rigid disk means includes means for straining the infused liquid to prevent the passage of the infused material through said piston means.

21. A beverage brewing system as recited in claim 18 wherein said operator means includes actuator means attached to said piston means and extending to the exterior of said container for enabling the depression of said piston means.

22. A beverage brewing system as recited in claim 21 wherein said operator means includes means for detachably attaching said actuator means to said piston means.

23. A beverage brewing system as recited in claim 18 wherein said piston means includes means for maintaining the angular alignment of said rigid and flexible disk means.

24. A beverage brewing system as recited in claim 18 wherein said infusing chamber means includes means for facilitating the insertion of said piston means into said infusing chamber means.

25. A beverage brewing system as recited in claim 24 wherein said infusing chamber means includes flange means for facilitating the removal of said infusing chamber means from said container means and retainer means for preventing the inadvertent displacement of said infusing chamber means from said container means during use.

26. A beverage brewing system as recited in claim 18 additionally including cover means for closing said container means open top, said container means including a handle adjacent said open top, said cover means including means for engaging said handle for aligning said cover means with respect to said container means.

27. A beverage brewing system as recited in claim 26 wherein said container means has means for facilitating pouring and said cover means includes a recessed portion for alignment with said pouring facilitating means.

28. A beverage brewing system comprising:
A) a cylindrical body having a closed end and an open end for receiving an infusible material and liquid in said cylindrical body for brewing a beverage,
B) a piston spanning said cylindrical body portion in a sealed relationship therewith, said piston having first and second rigid disks and an intermediate flexible disk including a one-way valve therethrough, each valve when open blocking the passage of infusible material and allowing the passage of the liquid, and C) an operator for moving said piston along said cylindrical body through said infusible material and liquid whereby said piston moves the infusible material toward one of said open and closed ends and forms a repository with said cylindrical body for the infusible material that is isolated from the liquid.

29. A beverage brewing system as recited in claim 28 wherein said piston includes a plurality of one-way valves therethrough.

30. A beverage brewing system as recited in claim 28 wherein the periphery of said intermediate flexible disk establishes a sliding seal relationship between said piston and the walls of said infusing chamber.

31. A beverage brewing system as recited in claim 30 wherein said flexible disk includes a plurality of angularly spaced one-way valve structures and each of said rigid disks include angularly spaced apertures aligned with said one-way valve structures.

32. A beverage brewing system as recited in claim 31 wherein each aperture in said first rigid disk has an opening that permits displacement of a corresponding flap valve.

33. A beverage brewing system as recited in claim 32 wherein each of said second rigid disks includes a plurality of apertures therethrough aligned with each one-way valve, said plurality of apertures being sized to strain the infusible material.

34. A beverage brewing system as recited in claim 31 wherein said operator includes a rod having one end attached to said piston.

35. A beverage brewing system as recited in claim 31 wherein said operator includes a rod having one end detachable attached to said piston.

36. A beverage brewing system as recited in claim 35 wherein said rod has a shank and shoulder at said one end and includes a thrust washer intermediate said shoulder and said piston.

37. A beverage brewing system as recited in claim 31 wherein each of said disks includes structures for maintaining the angular alignment of said first and second rigid disks and said intermediate flexible disk.

* * * * *